(12) United States Patent
Kato

(10) Patent No.: US 9,812,764 B2
(45) Date of Patent: *Nov. 7, 2017

(54) ANTENNA DEVICE AND WIRELESS DEVICE

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,371

(22) Filed: Nov. 30, 2016

(65) Prior Publication Data

US 2017/0084980 A1    Mar. 23, 2017

Related U.S. Application Data

(63) Continuation of application No. 14/085,830, filed on Nov. 21, 2013, now Pat. No. 9,543,642, which is a
(Continued)

(30) Foreign Application Priority Data

Sep. 9, 2011    (JP) .................................. 2011-196972

(51) Int. Cl.
*H01Q 1/38*    (2006.01)
*H01Q 1/22*    (2006.01)
*H01Q 7/00*    (2006.01)
*G06K 19/077*    (2006.01)
*H01Q 1/50*    (2006.01)

(52) U.S. Cl.
CPC ...... *H01Q 1/2225* (2013.01); *G06K 19/07794* (2013.01); *H01Q 1/38* (2013.01); *H01Q 1/50* (2013.01); *H01Q 7/00* (2013.01)

(58) Field of Classification Search
CPC .. H01Q 1/50; H01Q 1/38; H01Q 7/00; H01Q 1/2225
See application file for complete search history.

(56) References Cited

U.S. PATENT DOCUMENTS 8,350,768 B2 * 1/2013 Peters .............. G06K 19/06009
                                                           343/730
9,543,642 B2 * 1/2017 Kato ..................... H01Q 1/38
(Continued)

OTHER PUBLICATIONS

Kato, "Antenna Device and Wireless Device", U.S. Appl. No. 14/085,830, filed Nov. 21, 2013.

*Primary Examiner* — Dieu H Duong
(74) *Attorney, Agent, or Firm* — Keating & Bennett, LLP

(57) ABSTRACT

An RFID tag includes an antenna element and a feed device. The antenna element includes a base sheet and a coil conductor on the upper surface thereof. The feed device includes a feed element and an RFIC. The feed element includes a base sheet and a first coil conductor and a second coil conductor on the upper surface of the base sheet. The first coil conductor and the second coil conductor are arranged on the base sheet such that magnetic flux generated in the first coil conductor and the second coil conductor constitutes a closed magnetic circuit. The feed device is adhered to a coupling portion of the antenna element. As a result, the RFIC is strongly coupled to the antenna element.

16 Claims, 18 Drawing Sheets

Related U.S. Application Data continuation of application No. PCT/JP2012/072849, filed on Sep. 7, 2012.

(56) References Cited

U.S. PATENT DOCUMENTS

| | | | | |
|---|---|---|---|---|
| 2005/0007296 A1* | 1/2005 | Endo | .................. | G06K 19/0726 343/895 |
| 2007/0095926 A1* | 5/2007 | Zhu | .................. | G06K 19/07749 235/492 |
| 2008/0252551 A1* | 10/2008 | Kubo | ................... | H01Q 1/2208 343/867 |
| 2009/0201156 A1* | 8/2009 | Kato | ................ | G06K 19/07749 340/572.5 |

* cited by examiner

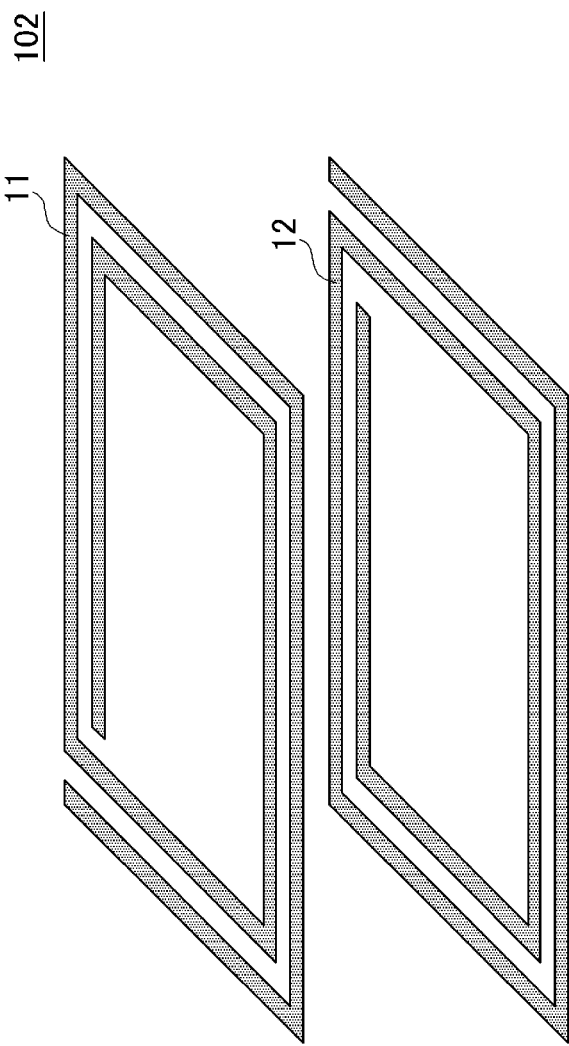
FIG. 4A
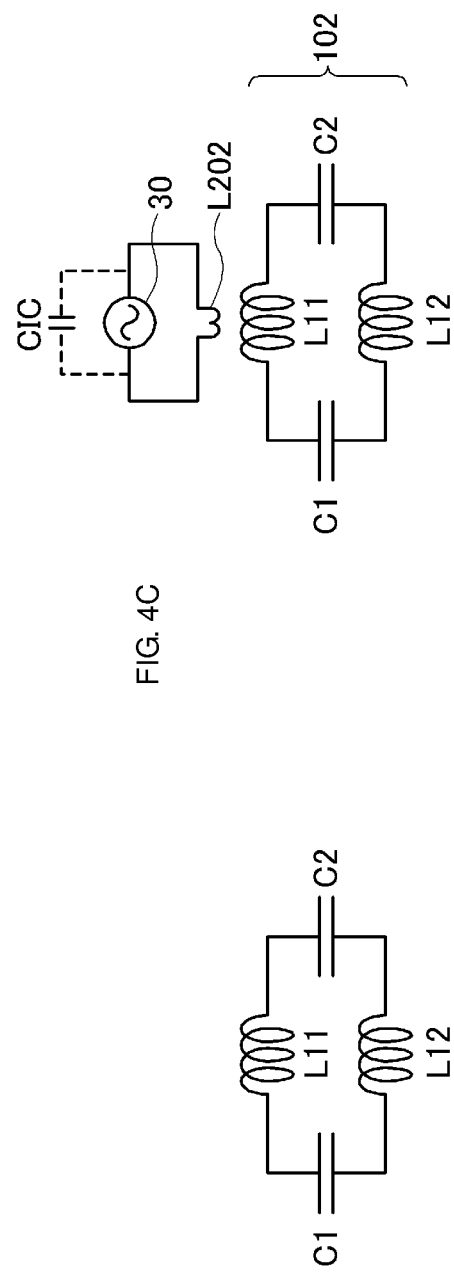
FIG. 4B
FIG. 4C

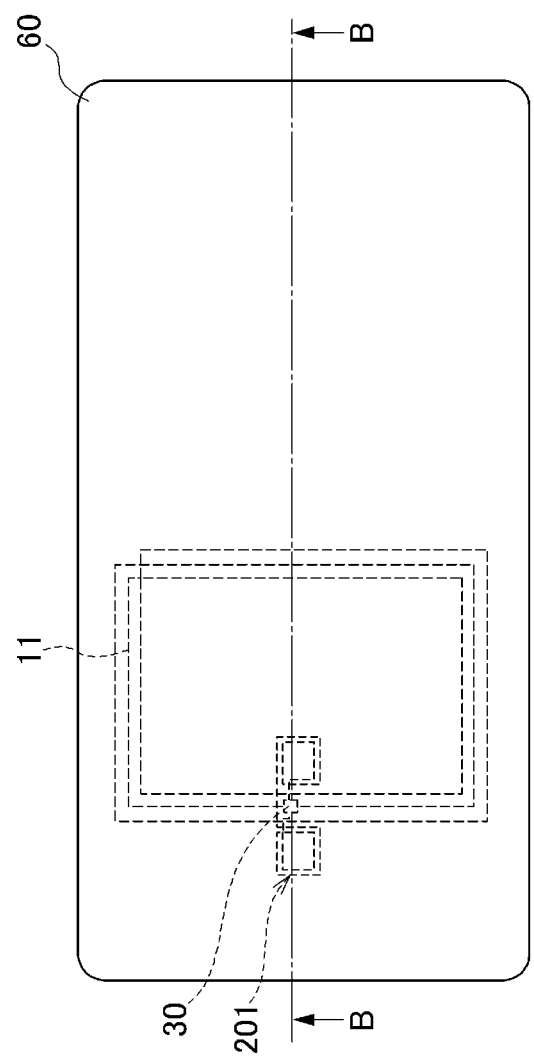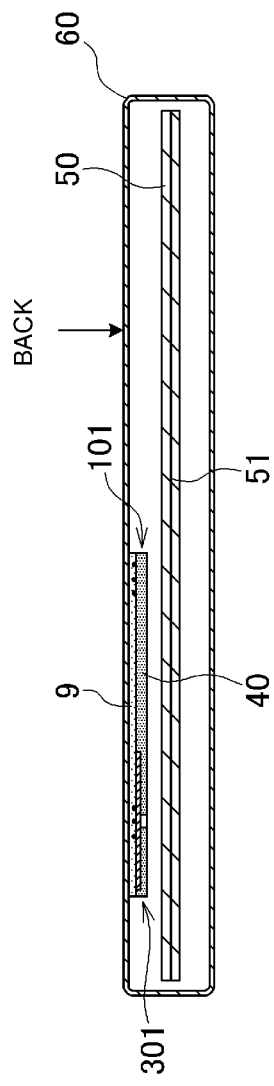

ANTENNA DEVICE AND WIRELESS DEVICE

BACKGROUND OF THE INVENTION

1. Field of the Invention

The present invention relates to an antenna device and a wireless device including the same.

2. Description of the Related Art

The radio frequency identification (RFID) system, in which a reader/writer and an RFID tag communicate with each other in a non-contact manner to transmit information between the reader/writer and the RFID tag, has become widespread. Such an RFID tag and a reader/writer include a radio frequency integrated circuit (RFIC) chip that processes high frequency signals and an antenna element that emits or receives high frequency signals. Examples of known RFID systems include the HF-band RFID system using the 13 MHz band, such as FeliCa®, and the UHF-band RFID system using the 900 MHz band which is used in warehouse management and the like.

A general RFID tag often adopts bonding that uses a gold bump for connecting an RFIC chip to an antenna element. This type of bonding, however, uses ultrasonic waves and therefore the bonding process is complicated. As a result, high connection reliability may not be ensured.

Accordingly, techniques disclosed in Japanese Patent Registration No. 2834584, Japanese Unexamined Patent Application Publication No. 2008-211572, and Japanese Unexamined Patent Application Publication No. 2009-111950 are known in which a feed coil is connected to an RFIC chip and the feed coil is connected to a main antenna via an electromagnetic field.

In an RFID tag in which a feed coil is connected to an RFIC chip and the feed coil is coupled to a main antenna via an electromagnetic field, connection between the RFIC chip and an antenna element can be readily made, however, this coupling is negligibly enhanced and, when a signal or electromagnetic energy received by the main antenna is transmitted to the RFIC chip, insertion loss may increase. As a result, the maximum communication distance may not be attained.

This is not only a problem for an RFID tag but is a problem also for an antenna device to which a feeder circuit including an RFIC is connected and a wireless device including the same.

SUMMARY OF THE INVENTION

Preferred embodiments of the present invention provide an antenna device in which an RFIC is strongly coupled to an antenna element, and a wireless device.

An antenna device according to a preferred embodiment of the present invention includes an antenna element including a coupling portion; and a feed element including a first coil conductor and a second coil conductor, the first coil conductor and the second coil conductor being arranged such that magnetic flux generated in the first coil conductor and the second coil conductor constitutes a closed magnetic circuit, wherein the feed element and the antenna element are disposed such that the closed magnetic circuit of the feed element extends around the coupling portion of the antenna element.

Preferably, the first coil conductor and the second coil conductor respectively have different winding axes and are electrically connected in series to each other.

Preferably, the antenna element includes a spiral or loop-shaped coil conductor, the coupling portion is part of the coil conductor, and the feed element is disposed across the coupling portion of the antenna element such that the first coil conductor and the second coil conductor are positioned on respective sides of the coupling portion.

Preferably, the first coil conductor and the second coil conductor are disposed adjacent to each other on the same plane.

Preferably, the first coil conductor and the second coil conductor are asymmetric to each other.

Preferably, the first coil conductor and the second coil conductor are provided on a base sheet.

Preferably, the antenna element has a resonance frequency that corresponds to a carrier frequency of a communication signal.

A wireless device according to another preferred embodiment of the present invention includes an antenna element including a coupling portion; a feed element including a first coil conductor and a second coil conductor, the first coil conductor and the second coil conductor being arranged such that magnetic flux generated in the first coil conductor and the second coil conductor constitutes a closed magnetic circuit; and an RFIC that is connected to the first coil conductor and the second coil conductor of the feed element, wherein the feed element and the antenna element are disposed such that the closed magnetic circuit of the feed element extends around the coupling portion of the antenna element.

Preferably, the RFIC and the feed element constitute a resonant circuit that resonates at a frequency corresponding to a carrier frequency of a communication signal.

According to the antenna device of various preferred embodiments of the present invention, a coupling portion of an antenna element which is coupled to a feed element is disposed in a closed magnetic circuit constituted by coil conductors of the feed element and therefore the feed element and the antenna element can be coupled to each other more strongly. As a result, lower insertion loss is attained in the transmission characteristics when a signal received by the antenna element is transmitted to the RFIC.

Furthermore, use of the wireless device according to various preferred embodiments of the present invention in an RFID tag or in a reader/writer increases the maximum communication distance of the RFID tag or reader/writer.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is an exploded perspective view of coil conductors 11 and 12 included in an antenna element 102 according to a second preferred embodiment of the present invention. FIG. 4B is an equivalent circuit diagram of the antenna element 102 illustrating the case where the two coil conductors 11 and 12 face each other with a base sheet interposed therebetween. FIG. 4C is an equivalent circuit diagram illustrating the case where a feed device is coupled to the antenna element.

FIG. 6A is a plan view of the back of a communication terminal apparatus according to a fourth preferred embodiment of the present invention. FIG. 6B is a cross-sectional view taken along the line B-B in FIG. 6A.

DETAILED DESCRIPTION OF THE PREFERRED EMBODIMENTS

First Preferred Embodiment

Figure 1:
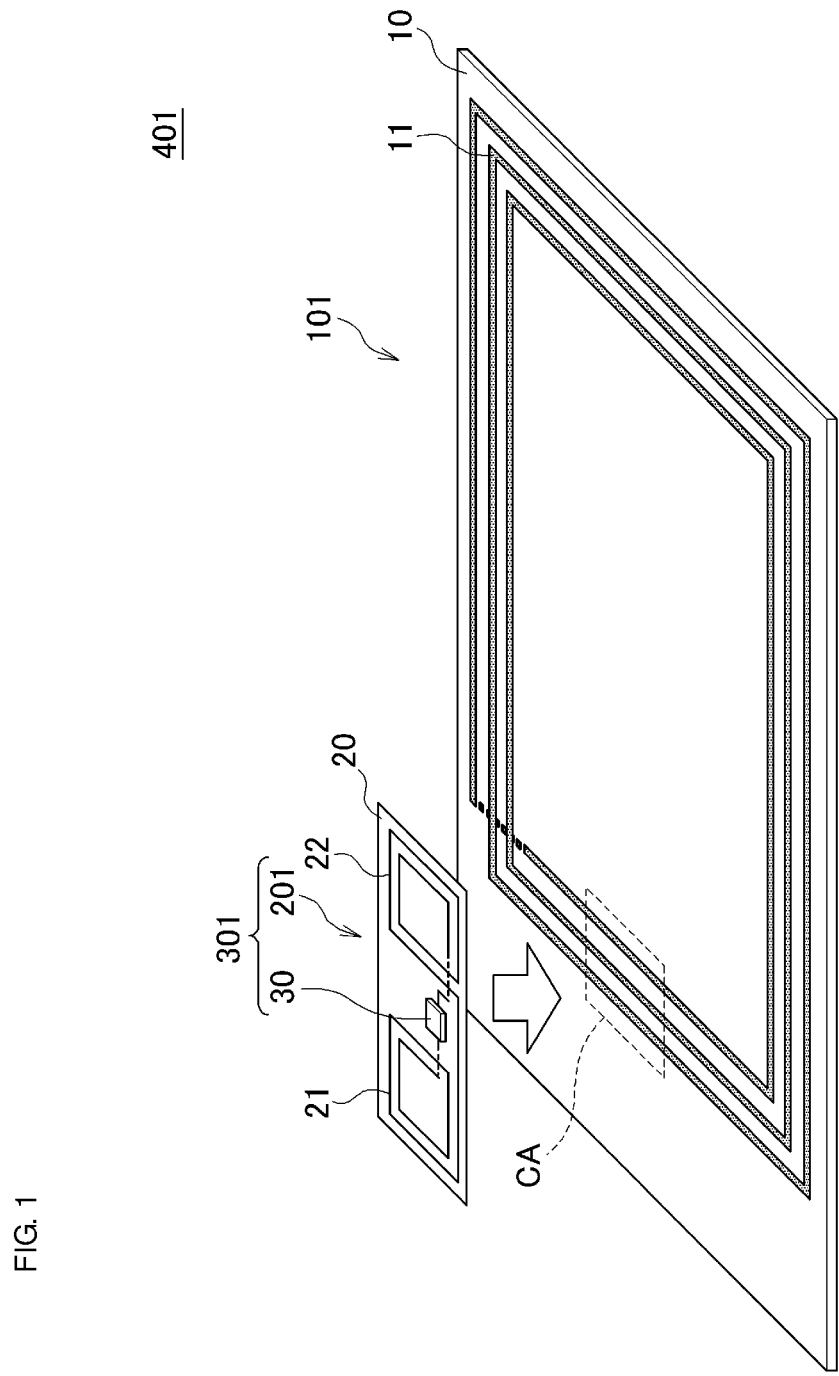
FIG. 1 is an exploded perspective view of an RFID tag 401 according to a first preferred embodiment of the present invention.
Figure 2A:
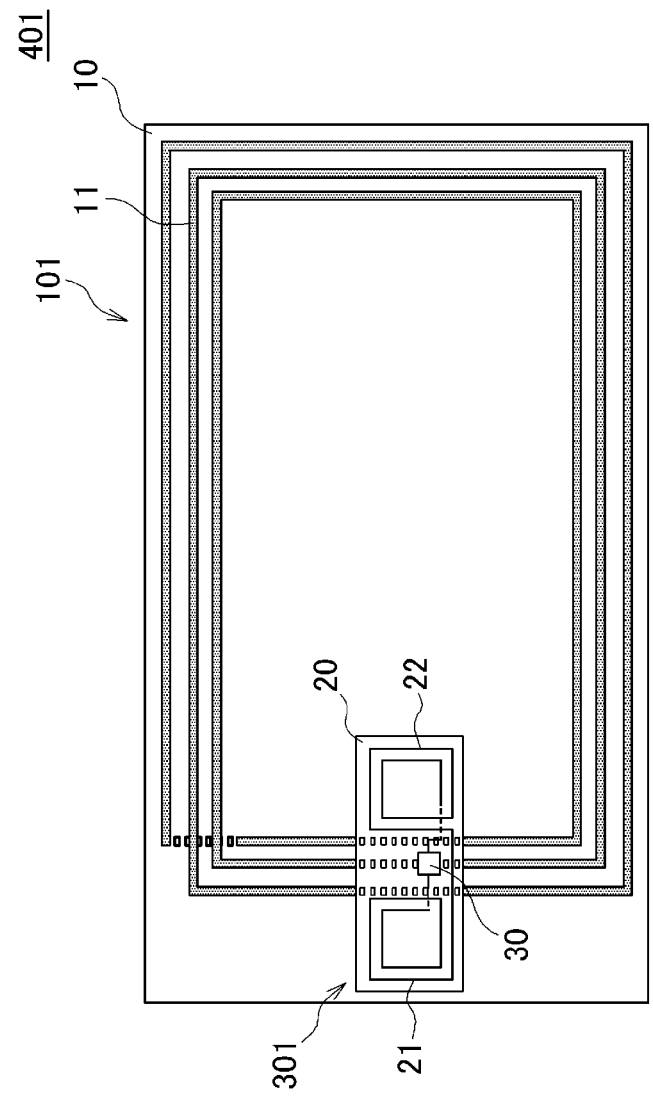
FIG. 2A is a plan view of the RFID tag 401.
Figure 2B:
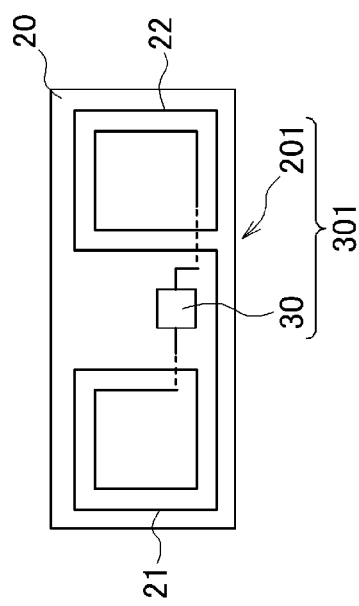
FIG. 2B is a plan view of a feed device 301.

FIG. 1 is an exploded perspective view of an RFID tag 401 according to a first preferred embodiment of the present invention. FIG. 2A is a plan view of the RFID tag 401, and FIG. 2B is a plan view of a feed device 301.

In this example, the RFID tag 401 is an RFID tag for an HF-band RFID system and includes an antenna element 101 and the feed device 301. The antenna element 101 preferably includes a base sheet 10 made of PET or the like and a coil conductor 11 located on the upper surface thereof. The feed device 301 preferably includes a feed element 201 and an RFIC 30.

The RFIC 30 is an IC chip for RFID. The RFIC 30 preferably includes a memory circuit, a logic circuit, and the like.

The feed element 201 preferably includes a base sheet 20 made of PET or the like, and a first coil conductor 21 and a second coil conductor 22 located on the upper surface of the base sheet 20.

As described below in detail, the first coil conductor and the second coil conductor 22 are arranged (wound and disposed) on the base sheet 20 such that magnetic flux generated in the first coil conductor 21 and the second coil conductor 22 constitutes a closed magnetic circuit.

The feed device 301 is disposed close to a coupling portion CA of the antenna element 101. For example, the feed device 301 is adhered to the coupling portion CA with a double-sided adhesive sheet therebetween. The feed element 201 is disposed relative to the antenna element 101 such that the closed magnetic circuit of the feed element 201 extends around the coupling portion CA of the antenna element 101 in a state where the feed device 301 is disposed close to the coupling portion CA of the antenna element 101.

Figure 3:
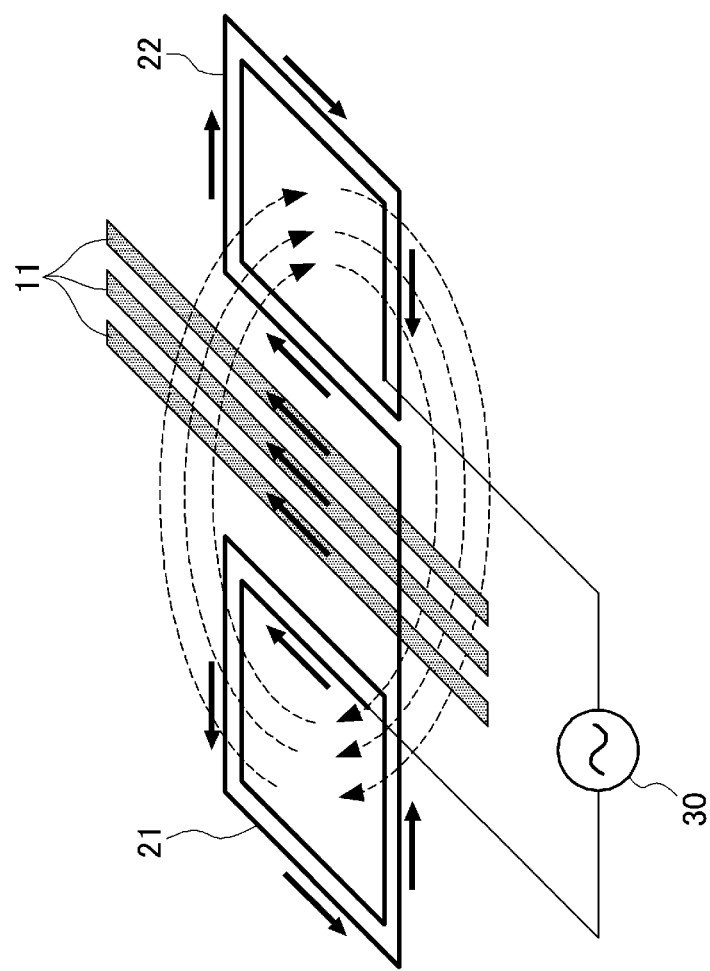
FIG. 3 is a diagram illustrating the relationship between magnetic flux generated in a first coil conductor 21 and a second coil conductor 22 of a feed element 201, and a coil conductor 11 of an antenna element 101.

FIG. 3 is a diagram illustrating the relationship between magnetic flux generated in the first coil conductor 21 and the second coil conductor 22 of the feed element 201, and the coil conductor 11 of the antenna element 101. When a current flows in the coil conductor 11 of the antenna element 101 in the direction shown by the straight arrows in FIG. 3, magnetic flux shown by the dashed arrows is present around the circumference of the coil conductor 11. The magnetic flux is interlinked with loop planes of the first coil conductor 21 and the second coil conductor 22 of the feed element 201. The first coil conductor 21 and the second coil conductor 22 are connected in series to each other so that an electromotive force of the first coil conductor 21 and an electromotive force of the second coil conductor 22 in this case are added together, and are also connected to the RFIC 30. The electromotive forces excited by the first coil conductor 21 and the second coil conductor 22 of the feed element 201 are therefore fed to the RFIC 30. Conversely, when a current is fed from the RFIC 30 to the first coil conductor 21 and the second coil conductor 22, magnetic flux passing through the loop planes of the first coil conductor and the second coil conductor 22 extends around the circumference of the coil conductor 11 of the antenna element, and a current is excited in the coil conductor 11.

As described above, the two coil conductors (the first coil conductor 21 and the second coil conductor 22) respectively having different winding axes are disposed across the coupling portion CA in the coil conductor 11 of the antenna element so as to be positioned on respective sides of the coupling portion CA, and the first coil conductor 21 and the second coil conductor 22 are connected to each other such that the magnetic flux that passes through the first coil conductor 21 and the second coil conductor 22 extends around the vicinity of the coil conductor of the antenna element (extends around along the closed magnetic circuit).

The first coil conductor 21 and the second coil conductor 22 are preferably disposed adjacent to each other on the same plane. More specifically, the first coil conductor 21 and the second coil conductor 22 are preferably arranged such that the closed magnetic circuit is located in a plane perpendicular or substantially perpendicular to the coil planes of the coil elements and such that the coupling portion of the antenna element extends in the direction perpendicular or substantially perpendicular to the plane on which the closed magnetic circuit is provided (the magnetic flux loop plane).

The first coil conductor 21 and the second coil conductor 22 preferably have respective winding axes that are parallel or substantially parallel to each other. This allows the magnetic flux passing through the first coil conductor 21 and the second coil conductor 22 to readily go around along the closed magnetic circuit, making coupling to the coil conductor 11 of the antenna element more secure.

In the example illustrated in FIG. 1 and FIG. 2, the RFID tag 401 is preferably formed by adhering the feed device 301, in which the RFIC 30 has been mounted on the feed element 201, to the antenna element 101. However, the RFIC 30 may preferably be mounted on the feed element 201 after the feed element 201 has been adhered to the antenna element 101. That is, the antenna device may preferably be constituted by the antenna element 101 and the feed element 201, without the RFIC 30 being mounted.

In a preferred embodiment of the present invention, the coupling portion of the antenna element preferably is provided in the closed magnetic circuit provided in the feed element and therefore the feeder circuit and the antenna element are coupled to each other via an electromagnetic field (mainly via a magnetic field). Accordingly, the coil elements and the antenna element are securely coupled to each other, making a wireless device having low insertion loss possible. Furthermore, the feed element constitutes the closed magnetic circuit and therefore, even if a metal body such as a ground conductor or a battery pack is provided in the vicinity of the feed element, there is little chance that formation of a magnetic field is prevented by such a metal body or a magnetic field is lost as an eddy current due to the metal body. Therefore, use of the antenna device and the wireless device according to a preferred embodiment of the present invention in an RFID tag or in a reader/writer increases the communication distance of the RFID tag or reader/writer.

In a preferred embodiment of the present invention, the antenna element preferably has a resonance frequency corresponding to the carrier frequency of the communication signal for the purpose of maximizing the communication distance. For the same reason, the RFIC and the feed element also preferably have a resonance frequency corresponding to the carrier frequency of the communication signal. As also described in the preferred embodiments described below, the resonance frequency constituted by the RFIC and the feed element is determined by the stray capacitance of the RFIC and the inductance (and the line capacitance) of the feeder circuit.

Second Preferred Embodiment

In a second preferred embodiment of the present invention, a structure of an antenna element which is different from that in the first preferred embodiment is described.

FIG. 4A is an exploded perspective view of coil conductors 11 and 12 included in an antenna element 102. The coil conductor 11 is located on a first main surface of a base sheet (not illustrated in FIG. 4) and the coil conductor 12 is located on a second main surface of the base sheet.

FIG. 4B is an equivalent circuit diagram of the antenna element 102 illustrating the case where the two coil conductors 11 and 12 face each other with the base sheet interposed therebetween. FIG. 4C is an equivalent circuit diagram illustrating the case where the feed device is coupled to the antenna element.

As illustrated in FIG. 4A, the coil conductor 11 and the coil conductor 12 of the antenna element 102 are preferably arranged in a rectangular or substantially rectangular spiral pattern. The winding direction of the coil conductor 11 is opposite to the winding direction of the coil conductor 12 (the same direction when viewed from one direction) and the coil conductors are electromagnetically coupled to each other. In FIG. 4B, an inductor L11 represents an inductance caused by the coil conductor 11 with a symbol, and an inductor L12 represents an inductance caused by the coil conductor 12 with a symbol. Capacitors C1 and C2 each represent a capacitance generated between the coil conductor 11 and the coil conductor 12 with a symbol of a lumped constant. In this way, the coil conductors 11 and 12 of the antenna element 102 constitute an LC circuit.

In FIG. 4C, an inductor L202 represents an inductance caused by a coil conductor that constitutes the feed element with a symbol. When the coil conductor of the feed element is electromagnetically coupled to the coil conductors 11 and 12 of the antenna element, the antenna element 102 operates as an antenna for the HF band. A capacitor CIC represents a capacitance connected to the coil conductor of the feed element, such as the parasitic capacitance of the RFIC 30, with a symbol. The capacitor CIC and the inductor L201 perform LC resonance. When the two LC resonance circuits, the RFIC 30 and the antenna element 102, are electromagnetically (mainly magnetically) coupled to each other, signals are transmitted between the antenna element 102 and the RFIC 30. Accordingly, the antenna element 102 operates as a resonance booster.

Third Preferred Embodiment

In a third preferred embodiment of the present invention, a structure of a feed element and a feed device, which is different from that in the first preferred embodiment, is described.

Figure 5:
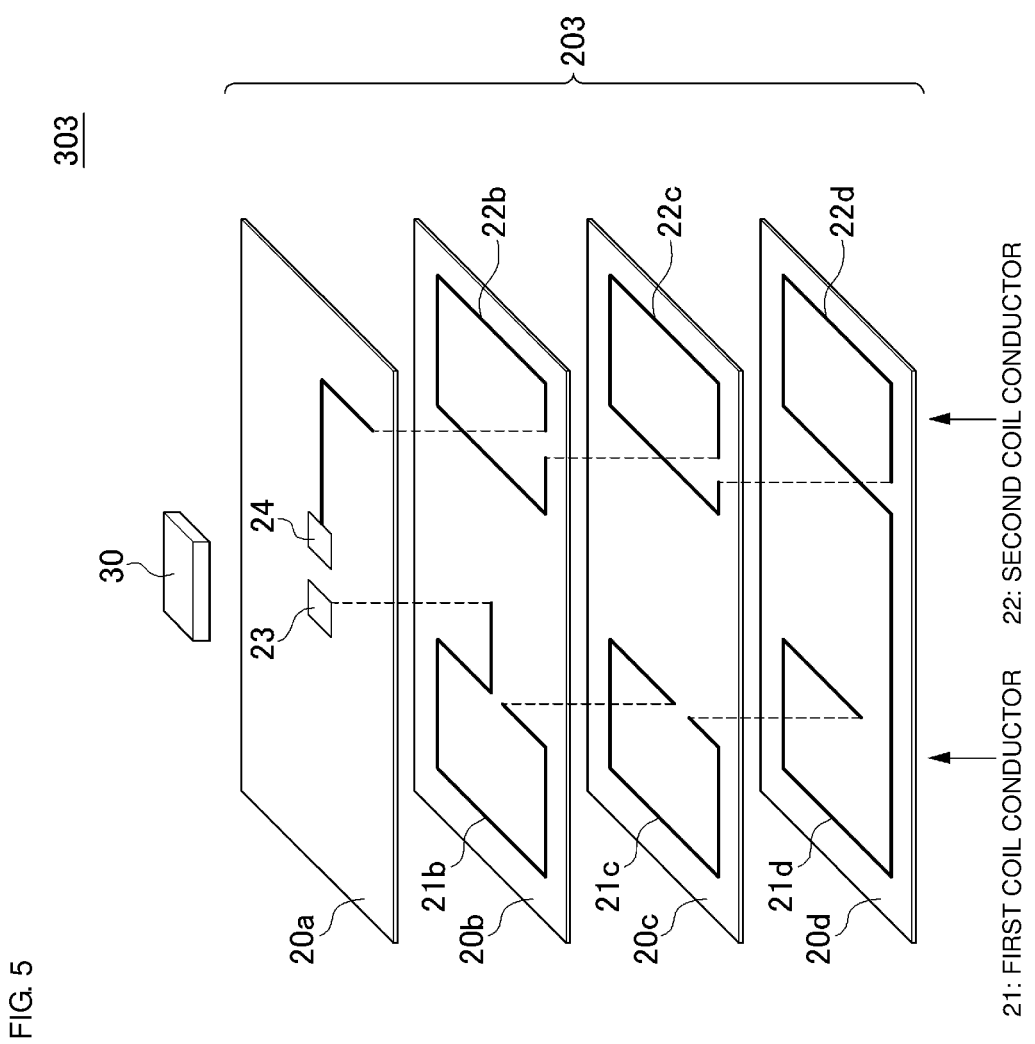
FIG. 5 is an exploded perspective view of a feed element 203 and a feed device 303 according to a third preferred embodiment of the present invention.

FIG. 5 is an exploded perspective view of a feed element 203 and a feed device 303 according to the third preferred embodiment. The feed element 203 includes a plurality of stacked dielectric base sheets on each of which a pattern of a coil conductor or the like is provided. Terminals 23 and 24 to connect the RFIC 30 are provided on a base sheet 20a. Coil conductors 21b and 22b are provided on a base sheet 20b. Coil conductors 21c and 22c are provided on a base sheet 20c. Coil conductors 21d and 22d are provided on a base sheet 20d. Via conductors are provided on each of the base sheets as shown by the dashed lines in FIG. 5 to define inter-layer connections.

The coil conductors 21b, 21c, and 21d and the via conductors connecting these coil conductors constitute the first coil conductor 21. The coil conductors 22b, 22c, and 22d and the via conductors connecting these coil conductors constitute the second coil conductor 22. In this way, the first coil conductor and the second coil conductor 22 are arranged on the base sheets 20a, 20b, 20c, and 20d such that magnetic flux generated in the first coil conductor 21 and the second coil conductor 22 constitutes a closed magnetic circuit.

In this way, the helical first coil conductor 21 and second coil conductor 22 are provided in a dielectric ceramic multilayer substrate. With this structure, a large coil opening is achieved even if the number of windings is increased. Therefore, even if the number of windings of the coil conductor of the feed element is increased, the feed element is strongly magnetically coupled to the coil conductor of the antenna element.

Fourth Preferred Embodiment

In a fourth preferred embodiment of the present invention, an example of a communication terminal apparatus including an RFID tag is described.

Figure 7:
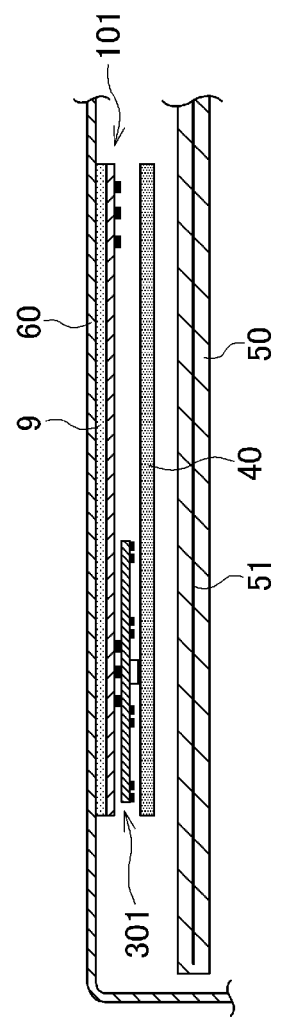
FIG. 7 is an enlarged cross-sectional view of an RFID tag portion.

FIG. 6A is a plan view of the back of the communication terminal apparatus. FIG. 6B is a cross-sectional view taken along the line B-B in FIG. 6A. FIG. 7 is an enlarged cross-sectional view of an RFID tag portion.

A printed wiring board 50 is accommodated inside a housing 60 and a ground conductor 51 is provided inside the printed wiring board 50. An antenna element 101, a feed device 301, and the like are provided on the inner surface of the housing.

The structure of the antenna element 101 and the feed device 301 is preferably the same as that in the first preferred embodiment. As illustrated in FIG. 7, a magnetic layer 40 such as a ferrite sheet is disposed between the antenna element 101 and feed device 301 and the printed wiring board 50. The magnetic layer 40 is arranged so that the ground conductor 51 does not seem equivalent to the antenna element 101 and feed device 301. The antenna element 101 is adhered to the inner surface of the housing 60 with an adhesive layer 9 therebetween. Also the magnetic layer 40 may be adhered to the antenna element 101 and feed device 301 with a double-sided adhesive sheet or the like therebetween.

In this way, the magnetic layer is arranged to block magnetic flux that is to enter a metal such as the ground conductor to prevent generation of an eddy current. Therefore, when an antenna device is integrated into an electronic device together with a metal body, a magnetic layer such as a ferrite sheet may be disposed between the antenna device and the metal body. The antenna device may be disposed on the inner surface of the housing so that the antenna device is kept as far away from the metal body as possible and so as to make sufficient use of the space.

Note that the metal body described above includes any item in which an eddy current that counteracts a magnetic field change by a coil antenna is likely to occur due to a metal present in the item, such as a mixed molded product of resin and metal powder, an item in which a metal sheet is molded to a resin item, or a battery or a liquid crystal display having a case that includes a metal portion, in addition to a printed wiring board on which a planar conductor that extends in a planar shape (in a flat shape) is provided.

Fifth Preferred Embodiment

Figure 8:
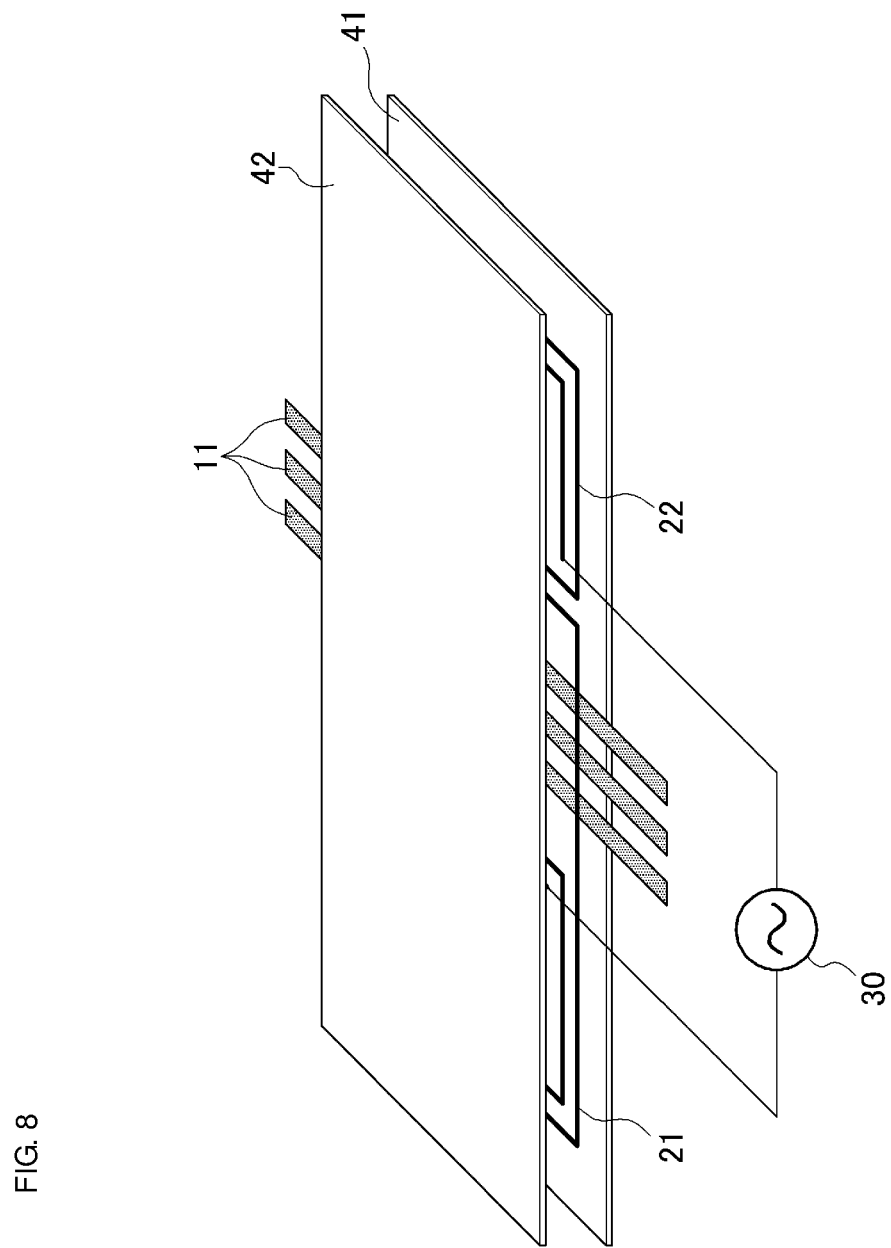
FIG. 8 is a perspective view of a main portion of an antenna device according to a fifth preferred embodiment of the present invention.

FIG. 8 is an exploded perspective view of a main portion of an antenna device according to a fifth preferred embodiment of the present invention. The antenna device includes an antenna element and a feed device. The structure of the antenna element and the feed device is preferably the same as that in the first preferred embodiment. In FIG. 8, base sheets of the antenna element and the feed device are not illustrated. Magnetic layers 41 and 42 are disposed so as to sandwich the coil conductor 11 provided in the antenna element and the first coil conductor 21 and the second coil conductor 22 provided in the feed element. The magnetic layers 41 and 42 are ferrite sheets or the like and are adhered to the antenna element and the feed device with double-sided adhesive sheets therebetween.

By sandwiching the coil conductor 11 provided in the antenna element and the first coil conductor 21 and the second coil conductor 22 provided in the feed element using the magnetic layers 41 and 42, most of the magnetic flux that passes through the first coil conductor 21 and the second coil conductor 22 passes through the magnetic layers 41 and 42. Accordingly, flux leakage is reduced and the coil conductor 11 in the antenna element and the coil conductors 21 and 22 in the feed element are coupled to each other more strongly.

Sixth Preferred Embodiment

Figure 9:
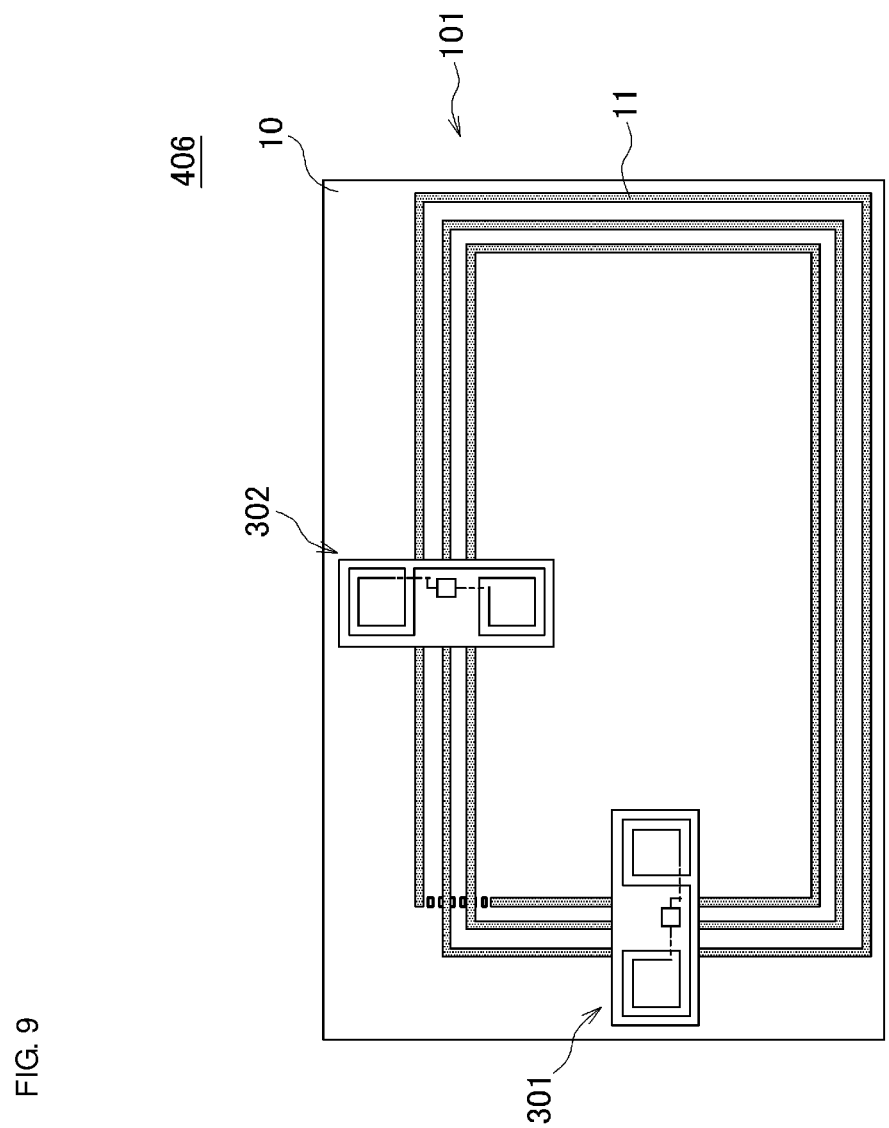
FIG. 9 is a plan view of an RFID tag 406 according to a sixth preferred embodiment of the present invention.

FIG. 9 is a plan view of an RFID tag 406 according to a sixth preferred embodiment of the present invention. The RFID tag 406 includes the antenna element 101 and two feed devices 301 and 302. The antenna element 101 preferably includes the base sheet 10 and the coil conductor 11 provided on the upper surface thereof. The feed devices 301 and 302 preferably are the feed devices described in the first preferred embodiment and each constituted by the feed element and the RFIC.

As illustrated in this figure, the feed devices 301 and 302 may be disposed at two positions in the coil conductor 11 of the antenna element 101 respectively. The feed device 301 may be of a different type from the feed device 302, which supports an RFID of a different system. Accordingly, the single antenna element 101 can be used among different systems.

Seventh Preferred Embodiment

Figure 10:
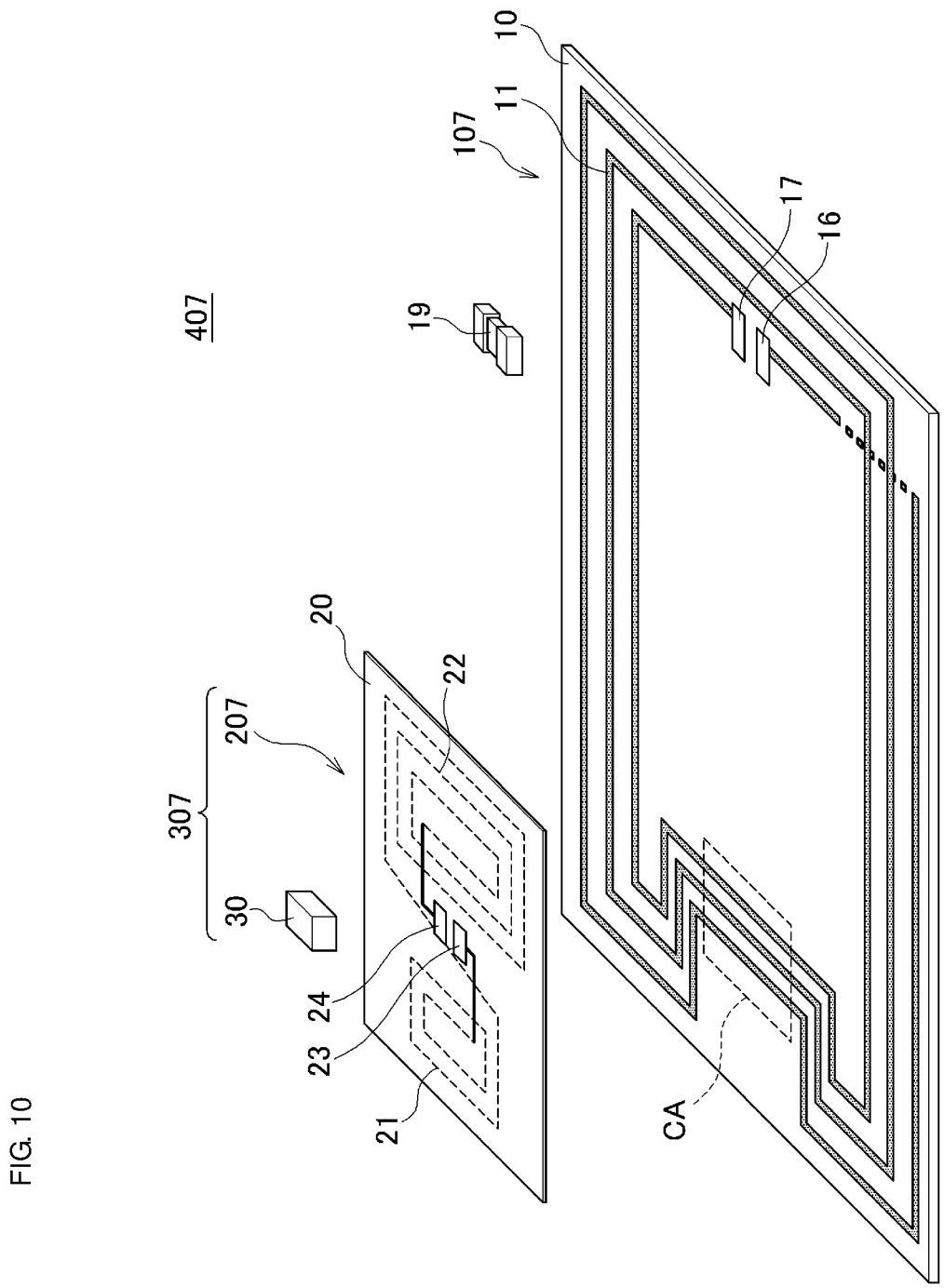
FIG. 10 is an exploded perspective view of an RFID tag 407 according to a seventh preferred embodiment of the present invention.
Figure 11:
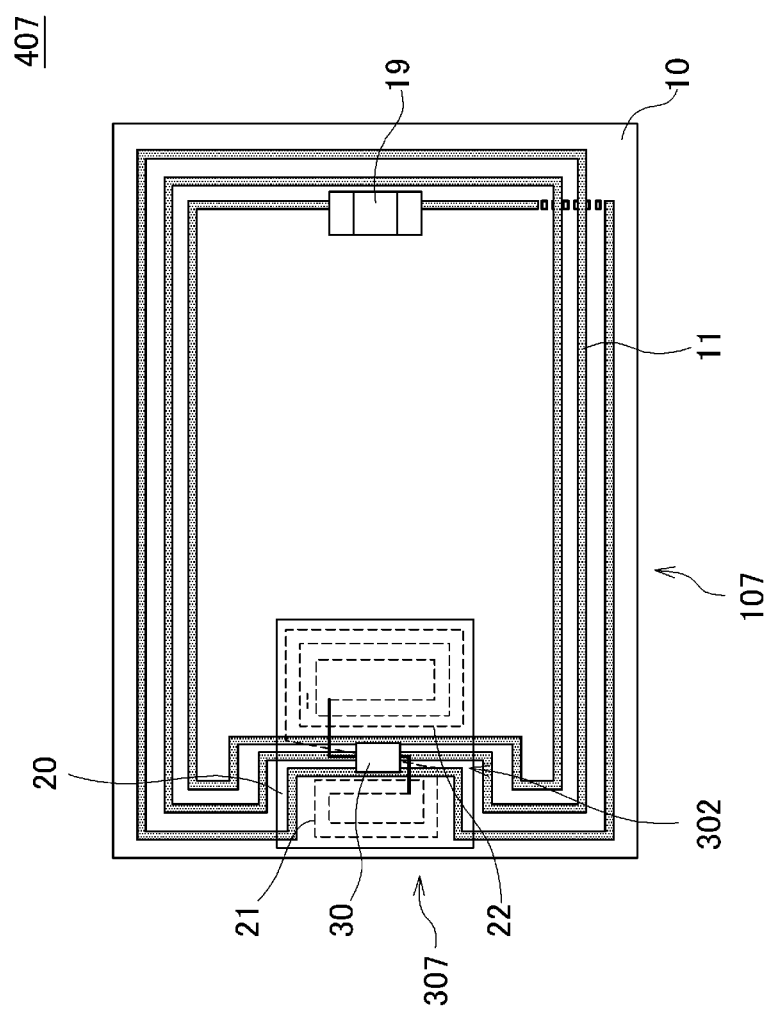
FIG. 11 is a plan view of the RFID tag 407.

FIG. 10 is an exploded perspective view of an RFID tag 407 according to a seventh preferred embodiment of the present invention. FIG. 11 is a plan view of the RFID tag 407.

In this example, the RFID tag 407 includes an antenna element 107 and a feed device 307. The antenna element 107 preferably includes the base sheet 10 and the coil conductor 11 located on the upper surface thereof. The feed device 307 preferably includes a feed element 207 and the RFIC 30.

The antenna element 107 is different from the antenna element 101 described in the first preferred embodiment and in which terminals 16 and 17 are located in the middle of the coil conductor 11 to mount a capacitive element 19. By mounting the capacitative element 19 on the terminals 16 and 17, the capacitative element 19 is inserted in series into the coil conductor 11. The coil conductor 11 and the capacitative element 19 together constitute an LC resonance circuit.

Furthermore, the antenna element 107 is different from the antenna element 101 described in the first preferred embodiment and in which the pattern of the coil conductor 11 is arranged such that the coupling portion CA is recessed toward the inner side portion of the coil opening. By shifting the coupling portion CA toward the inner side portion of the base sheet 10 in this manner, the position (adhering position) of the feed device 307 is accordingly shifted in the inward direction of the base sheet 10. As a result, the size of the entire RFID tag is reduced.

The feed element 207 is constituted by the base sheet 20 and the first coil conductor 21 and the second coil conductor 22 located on the upper surface of the base sheet 20. Terminals 23 and 24 to connect the RFIC 30 are located on the base sheet 20. The feed element 207 is different from the feed element 201 described in the first preferred embodiment in that the first coil conductor 21 and the second coil conductor 22 are asymmetric to each other. More specifically, the first coil conductor 21 is preferably relatively smaller and arranged to face the position of the recessed portion of the coil conductor of the antenna element 107. The second coil conductor 22 faces the coil opening of the coil conductor 11 of the antenna element 107 and therefore is allowed to have a sufficiently large size and is relatively larger. In this way, by making the first coil conductor 21 and the second coil conductor 22 asymmetric to each other, the size of the feed device is reduced while attaining the necessary number of windings.

Eighth Preferred Embodiment

In an eighth preferred embodiment of the present invention, an example of an RFID tag for a UHF-band RFID system is described.

Figure 12:
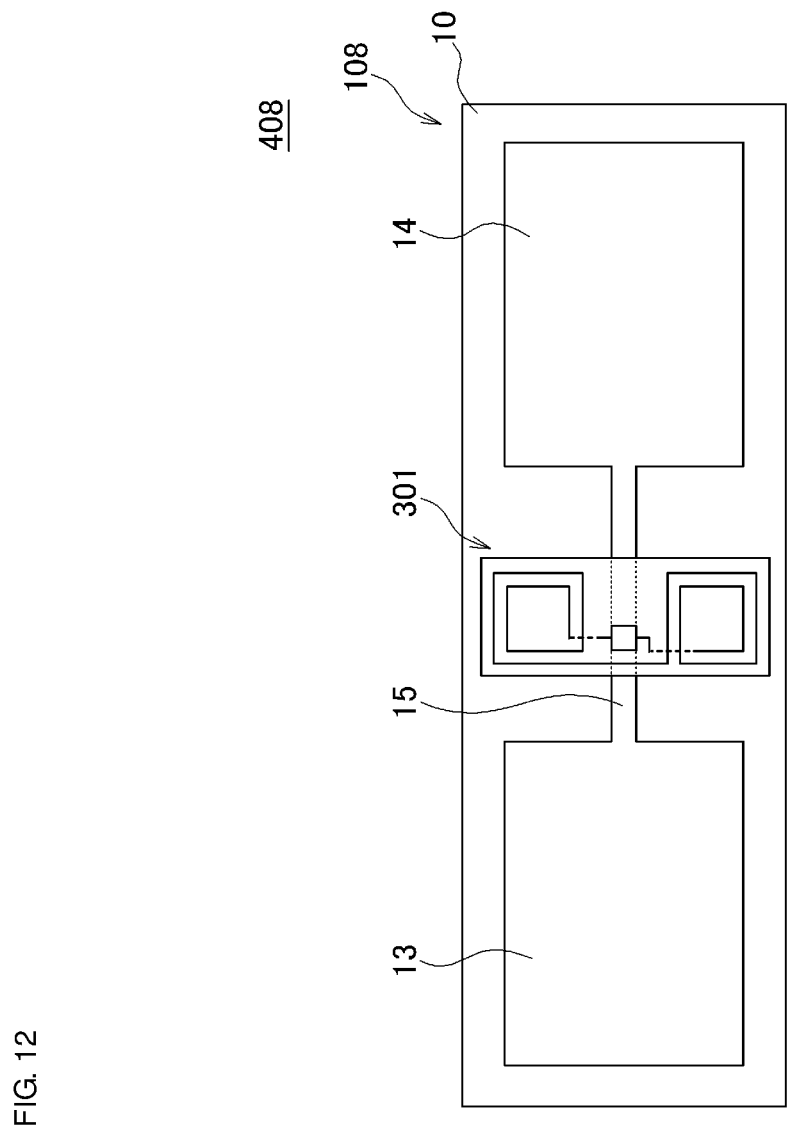
FIG. 12 is a plan view of an RFID tag 408 according to an eighth preferred embodiment of the present invention.

FIG. 12 is a plan view of an RFID tag 408 according to the eighth preferred embodiment. The RFID tag 408 includes an antenna element 108 and the feed device 301. The antenna element 108 preferably includes the base sheet 10, and radiation conductors 13 and 14 and a line portion 15 located on the upper surface thereof. The feed device 301 preferably is the feed device described in the first preferred embodiment.

The radiation conductors 13 and 14 and the line portion 15 in the antenna element 108 operate as a dipole antenna. The feed device 301 is coupled to the line portion 15 to feed electric power to the dipole antenna. Note that, in this preferred embodiment, the RFIC in the feed device 301 and the feed element that constitutes a closed magnetic circuit have a resonance point at a predetermined frequency and are in an impedance matched state.

Therefore, the antenna element 108 need not be structured to resonate at a predetermined frequency. In other words, the radiation conductors 13 and 14 may be conductors larger than the feed device 301.

Accordingly, in a wireless device such as a UHF-band RFID tag, the dipole antenna may be used, or a loop antenna, a patch antenna, or other types of antennas may be used. In any of such antenna elements, power feeding may be performed by magnetically coupling the antenna element to the coil conductor of the feed device.

Ninth Preferred Embodiment

Figure 13:
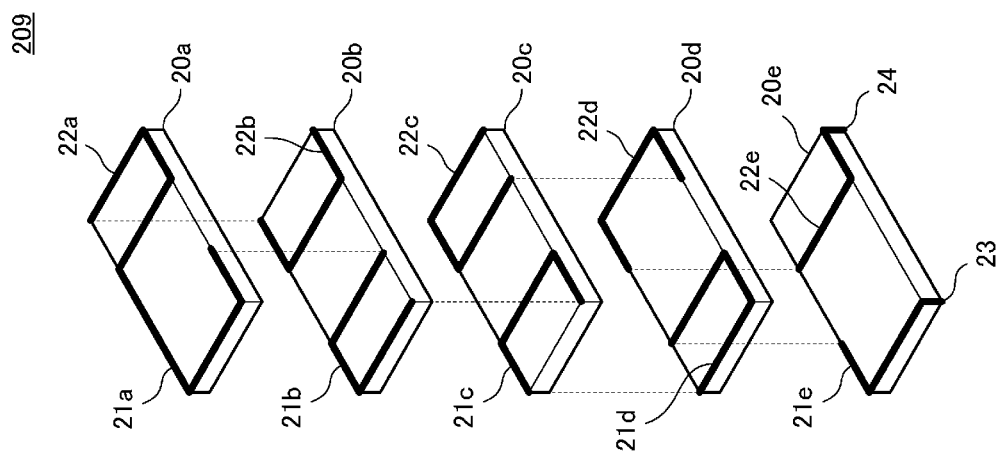
FIG. 13 is an exploded perspective view of a feed element 209 according to a ninth preferred embodiment of the present invention.

FIG. 13 is an exploded perspective view of a feed element 209 according to a ninth preferred embodiment of the present invention. The feed element 209 preferably includes a plurality of stacked insulator (for example, magnetic) base sheets on each of which a pattern of a coil conductor or the like is provided. Coil conductors 21a and 22a are provided on a base sheet 20a. Coil conductors 21b and 22b are provided on a base sheet 20b. Coil conductors 21c and 22c are provided on a base sheet 20c. Coil conductors 21d and 22d are provided on a base sheet 20d. Inter-layer connecting conductors are provided on the outer side surface of each of the base sheets.

The inter-layer connecting conductors described above are preferably arranged so as to be exposed on the outside of each of the base sheets, however, the inter-layer connecting conductors may be positioned in the inner side portion of each of the base sheets.

Figure 14:
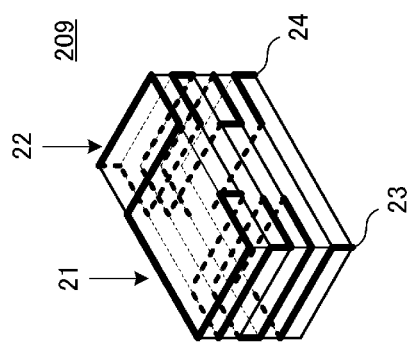
FIG. 14 is an external perspective view of the feed element 209.

FIG. 14 is an external perspective view of the feed element 209. Terminals 23 and 24 are led out to the underside of the rectangular or substantially rectangular parallelepiped stacked body.

In this way, the helical first coil conductor 21 and second coil conductor 22 are provided in a magnetic ceramic multilayer substrate.

Figure 15:
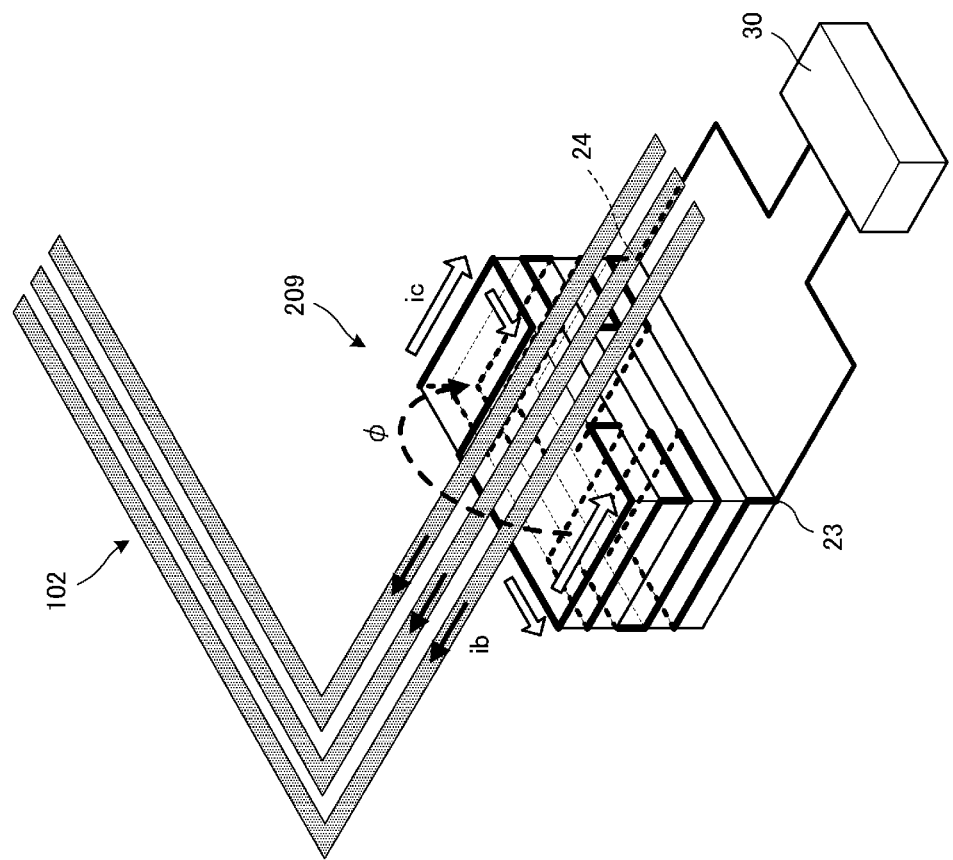
FIG. 15 is a partial perspective view illustrating coupling between the antenna element 102 and the feed element 209 that operate as a resonance booster.

FIG. 15 is a partial perspective view illustrating coupling between the antenna element 102 and the feed element 209 that operate as a resonance booster. The basic structure of the antenna element 102 is as illustrated in FIG. 4A and FIG. 4B. The RFIC 30 is connected to the feed element 209. As illustrated in this figure, the feed element 209 is disposed, for example, below the coil conductor of the antenna element 102.

Although not illustrated in FIG. 15, a matching circuit, a filter circuit, and the like are connected between the feed element 209 and the RFIC 30.

Figure 16:
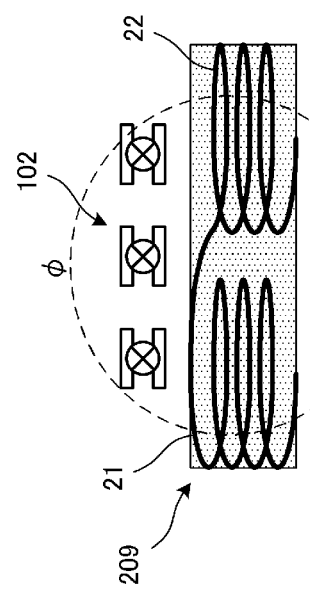
FIG. 16 is a conceptual diagram illustrating magnetic coupling between the antenna element 102 and the feed element 209.

FIG. 16 is a conceptual diagram illustrating magnetic coupling between the antenna element 102 and the feed element 209. The magnetic flux $\phi$ is generated by the first coil conductor 21 and the second coil conductor 22 and is interlinked with the coil conductor of the antenna element 102. The cross symbol in FIG. 16 represents the direction of the current that flows through the coil conductor.

Figure 17:
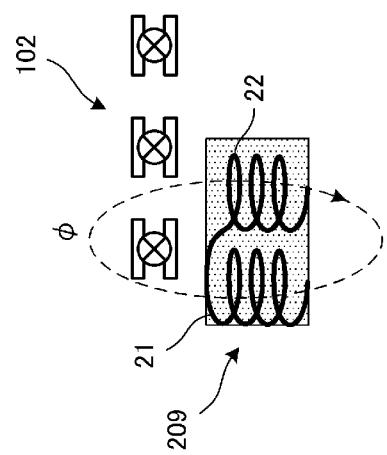
FIG. 17 is a conceptual diagram illustrating another magnetic coupling between the antenna element 102 and the feed element 209.

FIG. 17 is a conceptual diagram illustrating another magnetic coupling between the antenna element 102 and the feed element 209. As illustrated in this figure, the magnetic flux generated by the first coil conductor 21 and the second coil conductor 22 may be partially interlinked with the coil conductor of the antenna element 102.

Tenth Preferred Embodiment

Figure 18:
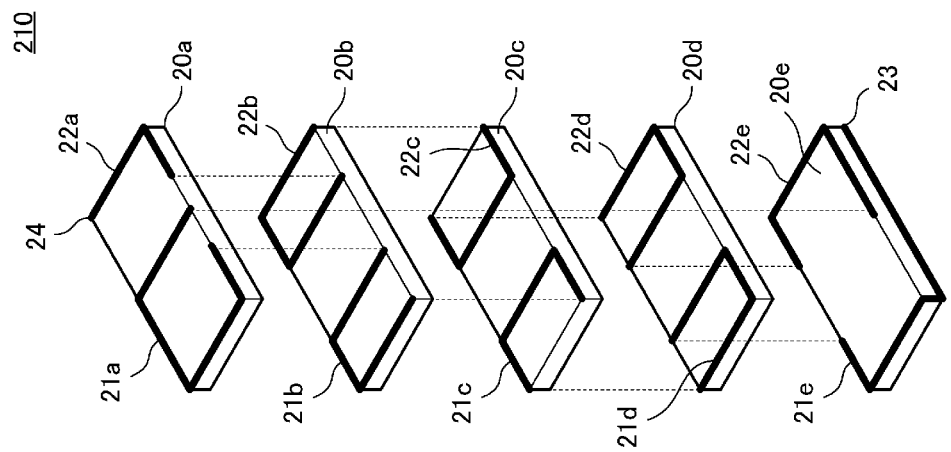
FIG. 18 is an exploded perspective view of a feed element 210 according to a tenth preferred embodiment of the present invention.

FIG. 18 is an exploded perspective view of a feed element 210 according to a tenth preferred embodiment of the present invention. The feed element 210 preferably includes a plurality of stacked insulator (for example, magnetic) base sheets on each of which a pattern of a coil conductor or the like is provided. The feed element 210 is different from the feed element 209 illustrated in FIG. 13 in the pattern of the coil conductor or the like on each of the base sheets.

Figure 19:
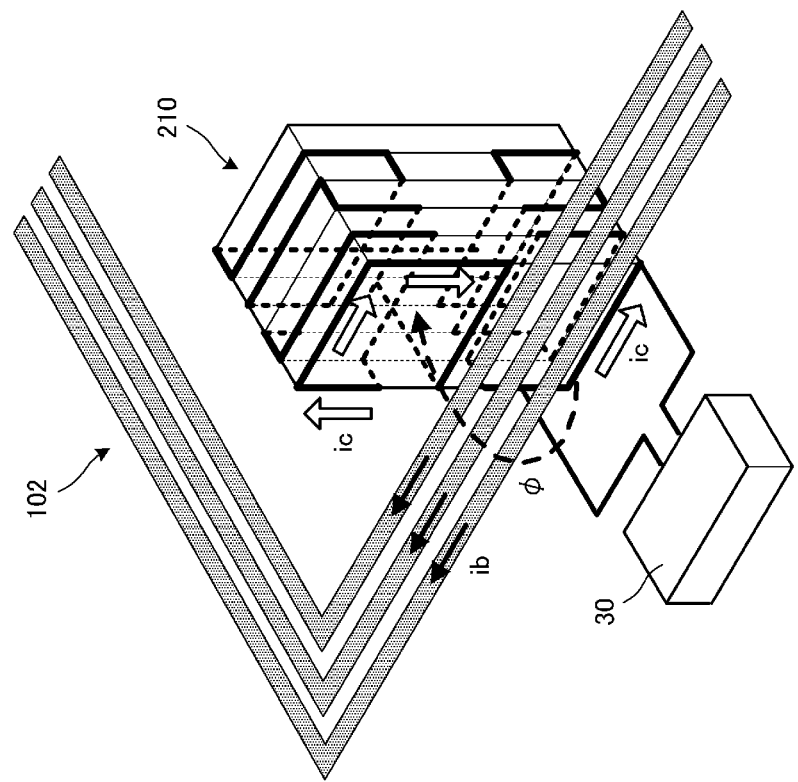
FIG. 19 is a partial perspective view illustrating coupling between the antenna element 102 and the feed element 210 that operate as a resonance booster.

FIG. 19 is a partial perspective view illustrating coupling between the antenna element 102 and the feed element 210 that operate as a resonance booster. As illustrated in this figure, the feed element 210 is disposed, for example, beside the coil conductor of the antenna element 102.

Although not illustrated in FIG. 19, a matching circuit, a filter circuit, and the like are connected between the feed element 210 and the RFIC 30.

Figure 20:
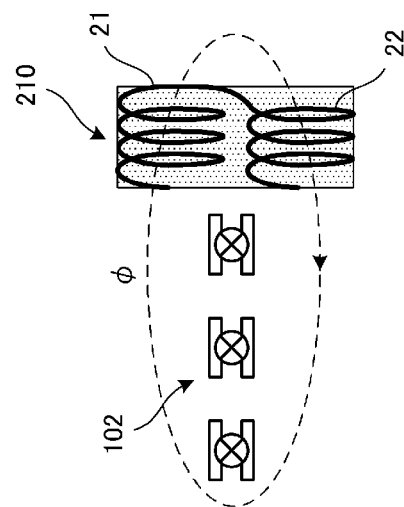
FIG. 20 is a conceptual diagram illustrating magnetic coupling between the antenna element 102 and the feed element 210.

FIG. 20 is a conceptual diagram illustrating magnetic coupling between the antenna element 102 and the feed element 210. The magnetic flux $\phi$ is generated by the first coil conductor 21 and the second coil conductor 22 and is interlinked with the coil conductor of the antenna element 102. The cross symbol in FIG. 20 represents the direction of the current that flows through the coil conductor.

Figure 21:
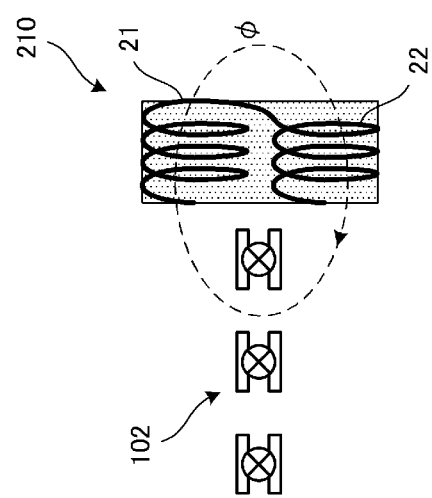
FIG. 21 is a conceptual diagram illustrating another magnetic coupling between the antenna element 102 and the feed element 210.

FIG. 21 is a conceptual diagram illustrating another magnetic coupling between the antenna element 102 and the feed element 210. As illustrated in this figure, the magnetic flux generated by the first coil conductor 21 and the second coil conductor 22 may be partially interlinked with the coil conductor of the antenna element 102.

Eleventh Preferred Embodiment

Figure 22:
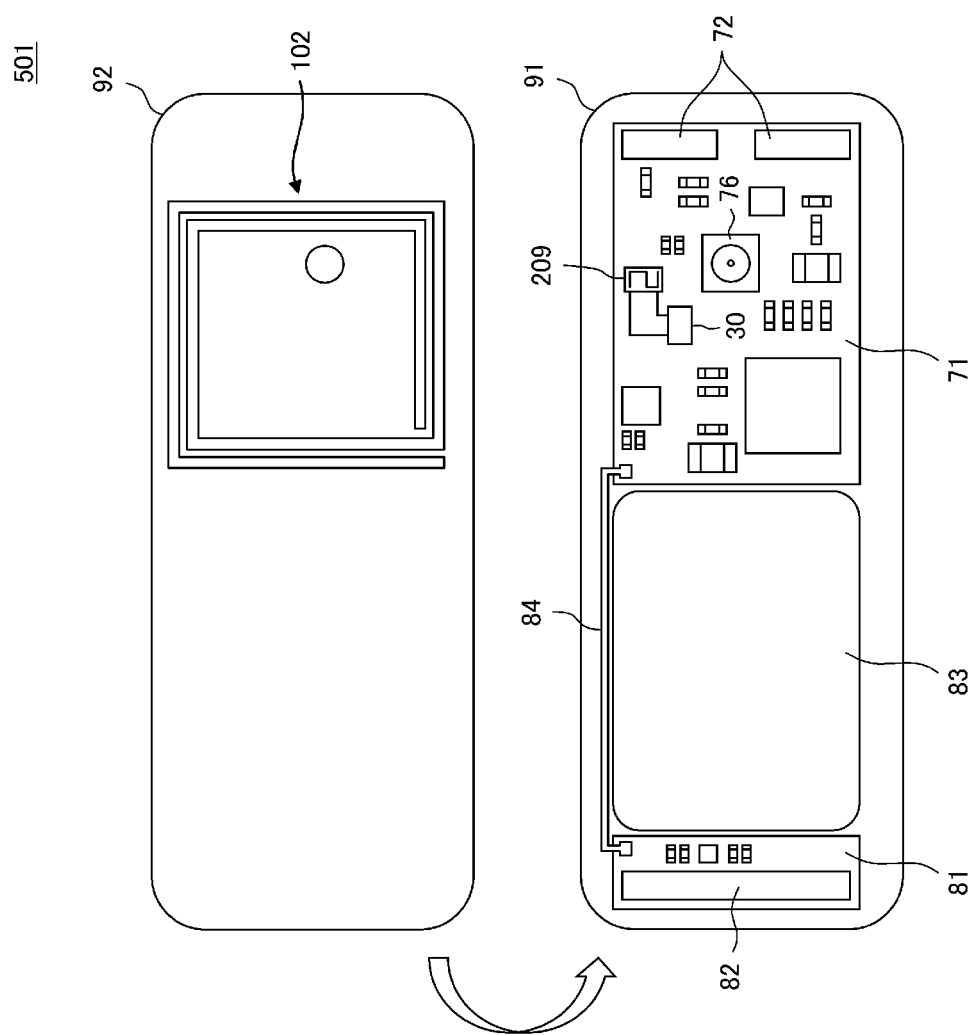
FIG. 22 is a diagram illustrating the structure of the interior of a housing of a wireless communication apparatus 501 according to an eleventh preferred embodiment of the present invention.

FIG. 22 is a plan view illustrating the structure of the interior of a housing of a wireless communication apparatus 501 according to an eleventh preferred embodiment of the present invention in a state where a lower housing 91 is isolated from an upper housing 92 so that the interior is exposed. Printed wiring boards 71 and 81, a battery pack 83, and the like are accommodated inside the lower housing 91. The RFIC 30 including a communication circuit and the feed element 209 are mounted on the printed wiring board 71. The structure of the feed element 209 is as illustrated in FIG.

13 and FIG. 14. A UHF-band antenna 72, a camera module 76, and the like are also mounted on the printed wiring board 71. On the printed wiring board 81, a UHF-band antenna 82 and the like are mounted. The printed wiring board 71 is connected to the printed wiring board 81 via a coaxial cable 84.

On the inner surface of the upper housing 92, the antenna element 102 is provided. The antenna element 102 is as illustrated in FIG. 4A and FIG. 4B. The antenna element 102 is magnetically coupled to the coil conductor of the antenna device 209 to thus operate as a magnetic antenna.

The coil conductor of the antenna device 209 and the antenna element 102 are disposed so as to be magnetically coupled to each other.

In the preferred embodiments described above, the antenna element 102 preferably is a coil conductor including a one-layer or two-layer structure, however, the number of layers is not specifically limited.

In the preferred embodiments described above, a portion of the coil conductor of the antenna element is preferably used as the coupling portion CA, however, a specific pattern for coupling that is to be connected to the antenna element may be provided apart from the antenna element.

In some of the preferred embodiments described above, an example is shown in which the first coil conductor 21 and the second coil conductor 22 are preferably connected in series with respect to the RFIC, however, the conductors may be connected in parallel.

The RFIC 30 described in the preferred embodiments described above may be structured as a bare chip IC or a package IC. For the package IC, a matching circuit may be provided on a package substrate.

The wireless device according to various preferred embodiments of the present invention may be applied to a reader/writer in addition to the RFID tag. Furthermore, the wireless device according to various preferred embodiments of the present invention may be applied to a wireless system other than an RFID system, such as a GPS receiving circuit, a wireless LAN, or a digital TV.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   an antenna element including a coupling portion; and
   a feed element including a first coil conductor and a second coil conductor, the first coil conductor and the second coil conductor being arranged such that magnetic flux generated in the first coil conductor and the second coil conductor constitutes a closed magnetic circuit; wherein
   the antenna device is a HF-band antenna device; and
   an opening of the first coil conductor and an opening of the second coil conductor of the feed element do not overlap with the antenna element in a planar view of coil surfaces of the first and second coil conductors, and
   the first coil conductor and the second coil conductor of the feed element are magnetically coupled to the coupling portion of the antenna element.

2. The antenna device according to claim 1, wherein the antenna element includes an opening, and the first coil conductor and the second coil conductor are magnetically coupled to each other via the opening of the antenna element.

3. The antenna device according to claim 2, wherein the opening of the first coil conductor is overlapped with the opening of the antenna element.

4. The antenna device according to claim 1, wherein the first coil conductor and the second coil conductor respectively have different winding axes and are electrically connected in series to each other.

5. The antenna device according to claim 1, wherein
   the antenna element includes a spiral or loop-shaped coil conductor;
   the coupling portion is part of the coil conductor; and
   the feed element is disposed across the coupling portion of the antenna element such that the first coil conductor and the second coil conductor are positioned on respective sides of the coupling portion.

6. The antenna device according to claim 1, wherein the first coil conductor and the second coil conductor are disposed adjacent to each other on a same plane.

7. The antenna device according to claim 1, wherein the first coil conductor and the second coil conductor are asymmetric to each other.

8. The antenna device according to claim 1, wherein the first coil conductor and the second coil conductor are located on a same base sheet.

9. The antenna device according to claim 1, wherein a magnetic layer is attached to the feed element.

10. The antenna device according to claim 1, wherein the antenna element includes a spiral-shaped or loop-shaped conductor.

11. The antenna device according to claim 10, wherein the antenna element has a resonance frequency that corresponds to a carrier frequency of a communication signal.

12. The antenna device according to claim 1, wherein the antenna element includes a third coil conductor and a fourth coil conductor arranged in a rectangular or substantially rectangular spiral pattern and having winding directions opposite to each other.

13. The antenna device according to claim 12, wherein the third coil conductor and the fourth coil conductor define an LC circuit.

14. The antenna device according to claim 1, wherein the feed element includes a plurality of dielectric base sheets each including a coil conductor pattern located thereon, and via conductors defining inter-layer connections.

15. A wireless device comprising:
   an antenna device including:
      an antenna element including a coupling portion; and
      a feed element including a first coil conductor and a second coil conductor, the first coil conductor and the second coil conductor being arranged such that magnetic flux generated in the first coil conductor and the second coil conductor constitutes a closed magnetic circuit; and
   an RFIC chip connected to the feed element; wherein
   the antenna device is a HF-band antenna device; and
   an opening of the first coil conductor and an opening of the second coil conductor of the feed element do not overlap with the antenna element in a planar view of coil surfaces of the first and second coil conductors, and both of the first coil conductor and the second coil conductor of the feed element are magnetically coupled to the coupling portion of the antenna element.

16. The wireless device according to claim 15, wherein the wireless device is one of an RFID tag, a GPS receiving circuit, a wireless LAN, and a digital TV.

* * * * *